(12) United States Patent
Stewart et al.

(10) Patent No.: US 12,485,910 B2
(45) Date of Patent: Dec. 2, 2025

(54) AUTOMATED SWARMING VEHICLE TEST ENVIRONMENT

(71) Applicant: Autonomous Solutions, Inc., Mendon, UT (US)

(72) Inventors: Brian Stewart, Smithfield, UT (US); Paul Lewis, Mendon, UT (US); Ben Hill, Mendon, UT (US); Dave Hollingshead, Mendon, UT (US); Sean Gardner, Mendon, UT (US); John Peterson, Mendon, UT (US); Kasper Woiceshyn, Mendon, UT (US); Eric Budd, Mendon, UT (US)

(73) Assignee: Autonomous Solutions, Inc., Mendon, UT (US)

( * ) Notice: Subject to any disclaimer, the term of this patent is extended or adjusted under 35 U.S.C. 154(b) by 491 days.

(21) Appl. No.: 17/031,288

(22) Filed: Sep. 24, 2020

(65) Prior Publication Data

US 2021/0086784 A1 Mar. 25, 2021

Related U.S. Application Data

(60) Provisional application No. 62/905,272, filed on Sep. 24, 2019.

(51) Int. Cl.
*B60W 50/04* (2006.01)
*B60W 30/09* (2012.01)
(Continued)

(52) U.S. Cl.
CPC .......... *B60W 50/045* (2013.01); *B60W 30/09* (2013.01); *G06F 11/3692* (2013.01); *G06F 11/3696* (2013.01); *G06F 11/3698* (2025.01); *B60W 2050/048* (2013.01); *B60W 2554/408* (2020.02)

(58) Field of Classification Search
CPC ............................ B60W 30/09; B60W 50/045
See application file for complete search history.

(56) References Cited

U.S. PATENT DOCUMENTS

2010/0094499 A1   4/2010  Anderson
2013/0197717 A1   8/2013  Fraser et al.
(Continued)

OTHER PUBLICATIONS

International Search Report and written opinion received for PCT Patent Application No. PCT/US2020/052488, mailed on Feb. 2, 2021, 12 pages.

*Primary Examiner* — Jess Whittington

(57) ABSTRACT

An automated swarming vehicle test environment includes a vehicle automation platform (VAP), a first swarming vehicle, and a second swarming vehicle. In some embodiments, a first test plan is created by a VAP for a first swarming vehicle. The first test plan comprises: a time series of vehicle trajectory data for the first swarming vehicle, and position data for the first swarming vehicle relative to a test vehicle. The first test plan is sent from the VAP to the first swarming vehicle. In some embodiments, a second test plan is created by the VAP for a second swarming vehicle. The second test plan comprises: a time series of vehicle trajectory data for the second swarming vehicle, and position data for the second swarming vehicle relative to the test vehicle. The second test plan is sent from the VAP to the second swarming vehicle.

14 Claims, 6 Drawing Sheets

(51) Int. Cl.
*G06F 11/3668* (2025.01)
*G06F 11/3698* (2025.01)

(56) References Cited

U.S. PATENT DOCUMENTS

2014/0129075 A1\* 5/2014 Carleton ............... B60W 30/16
　　　　　　　　　　　　　　　　　　　　701/27
2017/0300054 A1　10/2017 Hanson et al.
2017/0329339 A1\* 11/2017 Gordon ................. A62B 99/00
2020/0097023 A1\* 3/2020 Grundey ............. G05D 1/0293

\* cited by examiner

AUTOMATED SWARMING VEHICLE TEST ENVIRONMENT

BACKGROUND

Autonomous vehicles are predicted to be the next iteration (or frontier) of human transportation. Currently many automobiles integrate advanced driver-assistance systems in their vehicles that allow a vehicle to be driven by a human and with some autonomy assistance. Safety, of course, is the highest priority. It is predicted that autonomous vehicles one day will be safer than human driven vehicles since autonomous vehicles can communicate with each other, react predictably, don't get tired, don't drive inebriated, and are not distracted. Roadways with the combination of autonomous vehicles and human conducted vehicles can be messy.

SUMMARY

An automated swarming vehicle test environment is disclosed that includes a vehicle automation platform; a first swarming vehicle; and a second swarming vehicle. The first swarming vehicle includes a first vehicle control unit in communication with the vehicle automation platform and receives a first test plan from the vehicle automation platform; a first throttle subsystem in communication with and controlled by the first vehicle control unit; a first steering subsystem in communication with and controlled by the first vehicle control unit; and a first brake subsystem in communication with and controlled by the first vehicle control unit. In some embodiments, the first vehicle control unit controls the operation of the first throttle subsystem, the first steering subsystem, and the first brake subsystem based on the first test plan. In some embodiments, the second swarming vehicle includes a second vehicle control unit in communication with the vehicle automation platform and receives a second test plan from the vehicle automation platform; a second throttle subsystem in communication with and controlled by the second vehicle control unit; a second steering subsystem in communication with and controlled by the second vehicle control unit; and a second brake subsystem in communication with and controlled by the second vehicle control unit. In some embodiments, the second vehicle control unit controls the operation of the second throttle subsystem, the second steering subsystem, and the second brake subsystem based on the second test plan.

Some embodiments include a vehicle automation platform that comprises a transceiver and a controller communicatively coupled with the transceiver. In some embodiments, the controller: creates a first test plan for a first swarming vehicle and a second test plan for a second swarming vehicle. The first test plan, for example, comprises: a time series of vehicle trajectory data for the first swarming vehicle, and position data for the first swarming vehicle relative to a test vehicle. The second test plan, for example, comprises: a time series of vehicle trajectory data for the second swarming vehicle, and position data for the second swarming vehicle relative to a test vehicle. The first test plan may be sent to the first swarming vehicle via the transceiver and the second test plan may be sent to the second swarming vehicle via the transceiver. In some embodiments, the controller receives a system test plan from a user and creates the first test plan and the second test plan based on the system test plan.

Some embodiments include a method comprising creating at a vehicle automation platform a first test plan for a first swarming vehicle, sending the first test plan from the vehicle automation platform to the first swarming vehicle; creating at the vehicle automation platform a second test plan for a second swarming vehicle; and sending the second test plan from the vehicle automation platform to the first swarming vehicle. The first test plan may include a time series of vehicle trajectory data for the first swarming vehicle, and position data for the first swarming vehicle relative to a test vehicle. The second test plan may include a time series of vehicle trajectory data for the second swarming vehicle, and position data for the second swarming vehicle relative to the test vehicle; In some embodiments, the method may also include receiving a system test plan from a user; and wherein the first test plan is created based on the system test plan, and wherein the second test plan is created based on the system test plan.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Most road accidents occur due to human error. Car companies are making great advances to correct this by developing vehicles with advanced driver-assistance systems and autonomous vehicles. Many advanced driver-assistance systems may automate, adapt, or enhance vehicle systems for safety and better driving. These improvements reduce road fatalities by minimizing human error. Advanced driver assistance system features may include features to help avoid collisions and accidents, for example, by alerting the driver to potential problems or by taking over control of the vehicle.

Some embodiments of the invention include systems and methods for testing vehicles with advanced driver assistance systems or autonomous vehicles (e.g., test vehicles) using a swarm of autonomous vehicles following a choreographed maneuver according to a test plan. In some embodiments, a plurality of swarming vehicles can be assigned choreographed maneuvers to test the response of a test vehicle.

These choreographed maneuvers, for example, may be defined or input by test plan created or developed by user. In some embodiments, a test plan may be defined by an industry standard setting body.

As described in this disclosure, the term "autonomous vehicle" includes any vehicle that can be completely or partially operated with or without a driver. For example, an autonomous vehicle may include a vehicle with an advanced driver assistance system such as, for example, a system that can provide adaptive cruise control, collision avoidance, or pedestrian crash avoidance mitigation; incorporate satnav/traffic warnings; alert the driver to other cars or dangers; provide lane departure warnings; provide automatic lane centering; show what is in blind spots; or connect to smartphones for navigation instructions; etc. As another example, an autonomous vehicle may include a vehicle that can be operated completely without human interaction.

Figure 1:
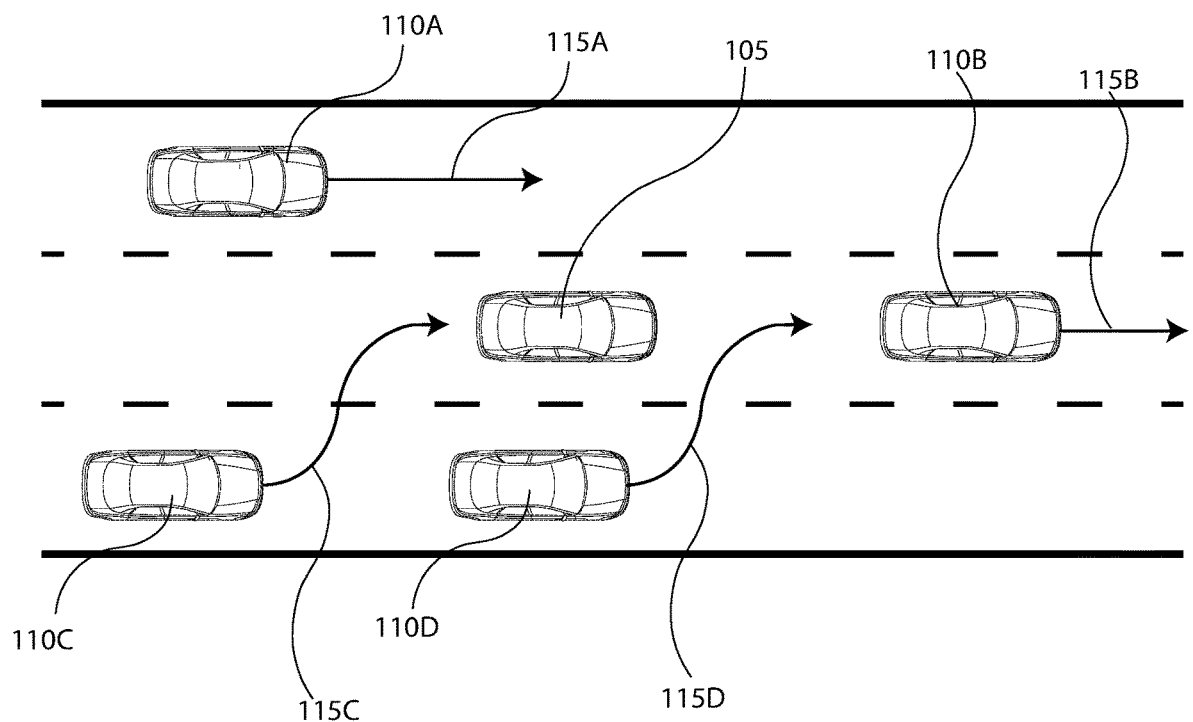
FIG. 1 illustrates an example automated swarming vehicle test environment according to some embodiments.

FIG. 1 illustrates a swarming scenario according to some embodiments. In this example, test vehicle 105 is shown driving down a three lane freeway with four swarming vehicles: swarming vehicle 110A, swarming vehicle 110B, swarming vehicle 110C, and swarming vehicle 110D (collectively or individually swarming vehicle 110). The test vehicle 105, for example, may be an autonomous vehicle. The swarming vehicles 110, for example, can also be autonomous vehicles that are programed to perform a specific choregraphed maneuver defined within a test environment as defined by a test plan. In this embodiment, the test environment is the three lane freeway shown in FIG. 1.

The test environment may include any type of roadway environment such as, for example, a multilane highway or freeway, a city intersection, a roundabout, a road through a school zone, a road with a pedestrian walkway, road with public transportation, a parking lot, a road with a bicycle lane, etc., or any combination of these.

The swarming vehicles 110 can be programmed to perform any number of choreographed maneuvers based on a test plan. In this example, the test plan has swarm vehicle 110A driving straight along the inside lane as shown by path 115A, the swarming vehicle 110B driving straight along the middle test lane as shown by path 115B, the swarming vehicle 110C driving in the outside lane and at some point of time swerving into the middle lane as shown by path 115C, and the swarming vehicle 110D driving in the outside lane and at some point of time swerving into the middle lane as shown by path 115D. With this test plan, for example, the test operators may strive to determine how the test vehicle 105 reacts to the choreographed maneuvers.

In some embodiments, the test plan may include an industry standard test plan and the results of the reaction by the test vehicle 105 can be used to determine whether the test vehicle meets any number of industry certifications or standards.

In some embodiments, test operators can adjust software on the test vehicle 105 based on the test vehicle's 105 reaction. Afterwards, the test plan can be repeated as needed with the test vehicle 105. a While four swarming vehicles 110 are shown, any number of swarm vehicles may be included.

In some embodiments, the swarming vehicles 110 may include a sedan, a van, a truck, a truck with a trailer, a semi-truck, a bus, a bicycle, a motorcycle, a train, a pedestrian, etc., or any combination of these.

In some embodiments, the test vehicle 105 can be independently operated relative to the swarming vehicles 110. For example, the test vehicle 105 may be operated by the test vehicle's operating system or control system whereas the swarming vehicles 110 may be controlled by vehicle automation platform (e.g., Mobius command and control developed by Autonomous Solutions Inc.).

In some embodiments, a test plan for a swarming vehicle 110 may include instructions to maneuver the swarming vehicle 110 around the test vehicle 105 such as, for example, based on a time series of trajectory data. In some embodiments, a test plan can be communicated to each swarming vehicle from the vehicle automation platform in real time or the test plan can be communicated prior to a test. In some embodiments, the test plan may include position, velocity, or acceleration values at each time interval with respect to the test vehicle 105 or with respect to a position within the test environment. In some embodiments, each of the heading, position, velocity, or acceleration value may include other data such as, for example, turning curvatures, trajectories, etc. At each time interval, for example, the vehicle control unit (VCU) within each swarming vehicle can determine where the swarming vehicle needs to be with respect to the test vehicle (or a fixed location within the test environment) and adjust the heading, position, velocity, or acceleration as needed to execute the test plan as accurately as possible.

In some embodiments, a test plan may be sent only to a swarming vehicle(s) and not to a test vehicle(s). In some embodiments, the test plan is sent to a swarming vehicle(s) and test vehicle(s) but the test vehicle does not ultimately follow any instructions in the test plan.

The following table is an example test plan for a swarming vehicle 110. The test plan, for example, may include one or more of the following data: time interval (e.g., on tenth of a second but any time interval can be used), test vehicle location (Vx), test vehicle location (Vy), first swarming vehicle location (T1x), first swarming vehicle location (T1y), second swarming vehicle location relative to the test v(T2x), second swarming vehicle location (T2y), test vehicle speed (VSpeed), first swarming vehicle speed (T1Speed), second swarming vehicle speed (T2Speed), test vehicle direction (Vheading), first swarming vehicle direction (T1Heading), second swarming vehicle direction (T2Heading), the first swarming vehicle position from the host (T1PosfmH), the first swarming vehicle angle from the host (T1ASngfmH), the second swarming vehicle position from the host T2PosfmH, or the second swarming vehicle angle from the host T2AngFmH. In this example, the position of the test vehicle (Vx, Vy) is set to zero and the positions of the swarming vehicles are determined relative to the test vehicle.

| Time | Vx | Vy | T1x | T1y | T2x | T2y | VSpeed | T1Speed | T2Speed | VHeading |
|---|---|---|---|---|---|---|---|---|---|---|
| 0.00 | 0.00 | 0.00 | 7.81 | −32.84 | 0.58 | −33.84 | 75.00 | 80.00 | 80.00 | 9.76 |
| 0.01 | 0.00 | 0.00 | 7.82 | −32.87 | 0.59 | −33.86 | 75.00 | 80.09 | 80.00 | 12.20 |
| 0.02 | 0.00 | 0.00 | 7.84 | −32.89 | 0.61 | −33.88 | 75.00 | 80.18 | 80.00 | 11.92 |
| 0.03 | 0.00 | 0.00 | 7.86 | −32.91 | 0.63 | −33.91 | 75.00 | 80.27 | 80.00 | 11.74 |
| 0.04 | 0.00 | 0.00 | 7.87 | −32.93 | 0.64 | −33.93 | 75.00 | 80.36 | 80.00 | 11.41 |
| 0.05 | 0.00 | 0.00 | 7.89 | −32.95 | 0.66 | −33.95 | 75.00 | 80.45 | 80.00 | 11.15 |

-continued

| | | | | | | | | | | |
|---|---|---|---|---|---|---|---|---|---|---|
| 0.06 | 0.00 | 0.00 | 7.91 | −32.98 | 0.67 | −33.97 | 75.00 | 80.54 | 80.00 | 10.85 |
| 0.07 | 0.00 | 0.00 | 7.92 | −33.00 | 0.69 | −33.99 | 75.00 | 80.63 | 80.00 | 10.62 |
| 0.08 | 0.00 | 0.00 | 7.94 | −33.02 | 0.71 | −34.01 | 75.00 | 80.72 | 80.00 | 10.45 |
| 0.09 | 0.00 | 0.00 | 7.96 | −33.05 | 0.73 | −34.03 | 75.00 | 80.81 | 80.00 | 10.13 |
| 0.10 | 0.00 | 0.00 | 7.98 | −33.07 | 0.74 | −34.05 | 75.00 | 80.89 | 80.00 | 9.81 |

| Time | T1Heading | T2Heading | T1PosfrmH | T1AngfrmH | T2PosfrmH | T2AngfrmH |
|---|---|---|---|---|---|---|
| 0.00 | 7.44 | 7.44 | 33.76 | 1.92 | 33.85 | 14.32 |
| 0.01 | 10.05 | 10.04 | 33.78 | 1.91 | 33.87 | 14.30 |
| 0.02 | 9.75 | 9.75 | 33.81 | 1.89 | 33.89 | 14.27 |
| 0.03 | 9.36 | 9.36 | 33.83 | 1.87 | 33.91 | 14.24 |
| 0.04 | 9.07 | 9.08 | 33.86 | 1.85 | 33.93 | 14.22 |
| 0.05 | 8.77 | 8.78 | 33.89 | 1.84 | 33.95 | 14.19 |
| 0.06 | 8.57 | 8.57 | 33.91 | 1.82 | 33.97 | 14.17 |
| 0.07 | 8.22 | 8.22 | 33.94 | 1.80 | 34.00 | 14.14 |
| 0.08 | 7.91 | 7.91 | 33.96 | 1.78 | 34.02 | 14.10 |
| 0.09 | 7.71 | 7.70 | 33.99 | 1.76 | 34.04 | 14.08 |
| 0.10 | 7.41 | 7.55 | 34.02 | 1.74 | 34.06 | 14.06 |

The following table is another example test plan for a swarming vehicle 110. The test plan, for example, may include one or more of the following data: time interval (e.g., on tenth of a second but any time interval can be used), test vehicle location (Vx), test vehicle location (Vy), first swarming vehicle location (T1x), first swarming vehicle location (T1y), second swarming vehicle location relative to the test v(T2x), second swarming vehicle location (T2y), test vehicle speed (VSpeed), first swarming vehicle speed (T1Speed), second swarming vehicle speed (T2Speed), test vehicle direction (Vheading), first swarming vehicle direction (T1Heading), and second swarming vehicle direction (T2Heading). In this example, the position of the test vehicle (Vx, Vy) is set to zero and the positions of the swarming vehicles are determined relative to the test vehicle.

| Time | Vx | Vy | T1x | T1y | T2x | T2y | VSpeed | T1Speed | T2Speed | VHeading | T1Heading | T2Heading |
|---|---|---|---|---|---|---|---|---|---|---|---|---|
| 0.00 | 0.00 | 0.00 | 7.81 | −32.84 | 0.58 | −33.84 | 75.00 | 80.00 | 80.00 | 9.76 | 7.44 | 7.44 |
| 0.01 | 0.00 | 0.00 | 7.82 | −32.87 | 0.59 | −33.86 | 75.00 | 80.09 | 80.00 | 12.20 | 10.05 | 10.04 |
| 0.02 | 0.00 | 0.00 | 7.84 | −32.89 | 0.61 | −33.88 | 75.00 | 80.18 | 80.00 | 11.92 | 9.75 | 9.75 |
| 0.03 | 0.00 | 0.00 | 7.86 | −32.91 | 0.63 | −33.91 | 75.00 | 80.27 | 80.00 | 11.74 | 9.36 | 9.36 |
| 0.04 | 0.00 | 0.00 | 7.87 | −32.93 | 0.64 | −33.93 | 75.00 | 80.36 | 80.00 | 11.41 | 9.07 | 9.08 |
| 0.05 | 0.00 | 0.00 | 7.89 | −32.95 | 0.66 | −33.95 | 75.00 | 80.45 | 80.00 | 11.15 | 8.77 | 8.78 |
| 0.06 | 0.00 | 0.00 | 7.91 | −32.98 | 0.67 | −33.97 | 75.00 | 80.54 | 80.00 | 10.85 | 8.57 | 8.57 |
| 0.07 | 0.00 | 0.00 | 7.92 | −33.00 | 0.69 | −33.99 | 75.00 | 80.63 | 80.00 | 10.62 | 8.22 | 8.22 |
| 0.08 | 0.00 | 0.00 | 7.94 | −33.02 | 0.71 | −34.01 | 75.00 | 80.72 | 80.00 | 10.45 | 7.91 | 7.91 |
| 0.09 | 0.00 | 0.00 | 7.96 | −33.05 | 0.73 | −34.03 | 75.00 | 80.81 | 80.00 | 10.13 | 7.71 | 7.70 |
| 0.10 | 0.00 | 0.00 | 7.98 | −33.07 | 0.74 | −34.05 | 75.00 | 80.89 | 80.00 | 9.81 | 7.41 | 7.55 |

The above tables only shows trajectory values for two swarming vehicles. Any number of swarming vehicles may be included in a test plan.

Figure 2:
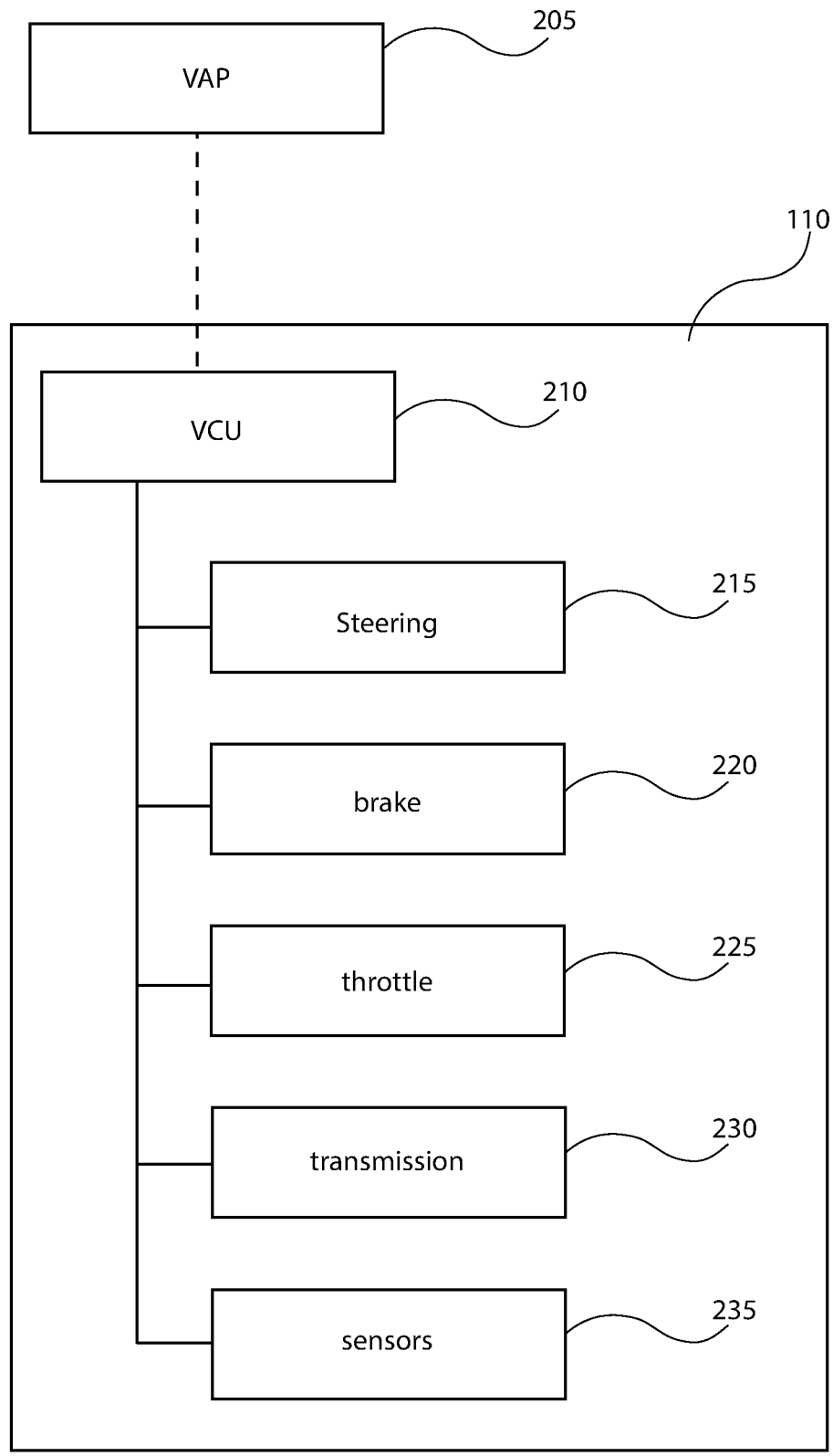
FIG. 2 is a block diagram of an automated swarming vehicle test system hardware according to some embodiments.

In some embodiments, each swarming vehicle 110 may include a vehicle control unit (VCU) 215 that is in communication (e.g., wireless communication) with a vehicle automation platform (VAP) 205 as shown in FIG. 2. The VCU 210 can control the swarming vehicle's steering 215, brake 220, throttle 225, or transmission 230 systems. In some embodiments, the VCU 210 be in communication with any number of vehicle sensors 235 such as, for example, a GPS sensor, a speedometer, lidar, radar, camera, etc. In some embodiments, the VCU 210 may include all or some of the components of computational system 600. In some embodiments, the VAP 205 may include all or some of the components of computational system 600.

In some embodiments, the VAP 205 may modify a user created test plan. For example, a specific vehicle may have unique or specific acceleration rates, deceleration rats, turning radii, etc. that may be updated or modified by the VAP 205. In some embodiments, a modified test plan may include trajectory data for a single or specific swarming vehicle.

In some embodiments, the VCU 210 can create a path segment from the test plan. The path segment may describe the path (e.g., the paths 115 in FIG. 1) that each swarming vehicle 110 will follow over time. The VCU 210 may compare the position, velocity, or heading of the swarming vehicle 110 with the position, velocity, or heading specified in the test plan for past time intervals or for future time intervals. If the swarming vehicle 110 is out of position or predicted to be out of position (within predetermined tolerances or test plan provided tolerances), the VCU 210 may adjust the speed or heading of the swarming vehicle by sending commands to the steering 215, brake 220, throttle 225, or transmission 230 subsystems, etc. For example, if the swarming vehicle 110 is going to slow or is behind on its position, the VCU 210 can send a signal to the throttle 225 to apply more gas to the engine (or electricity to the motor) to speed up the swarming vehicle 110. As another example, if the swarming vehicle 110 is moving in an incorrect heading then the VCU 210 can send a command to the steering 215 to change the direction the swarming vehicle 110 is heading.

Figure 3:
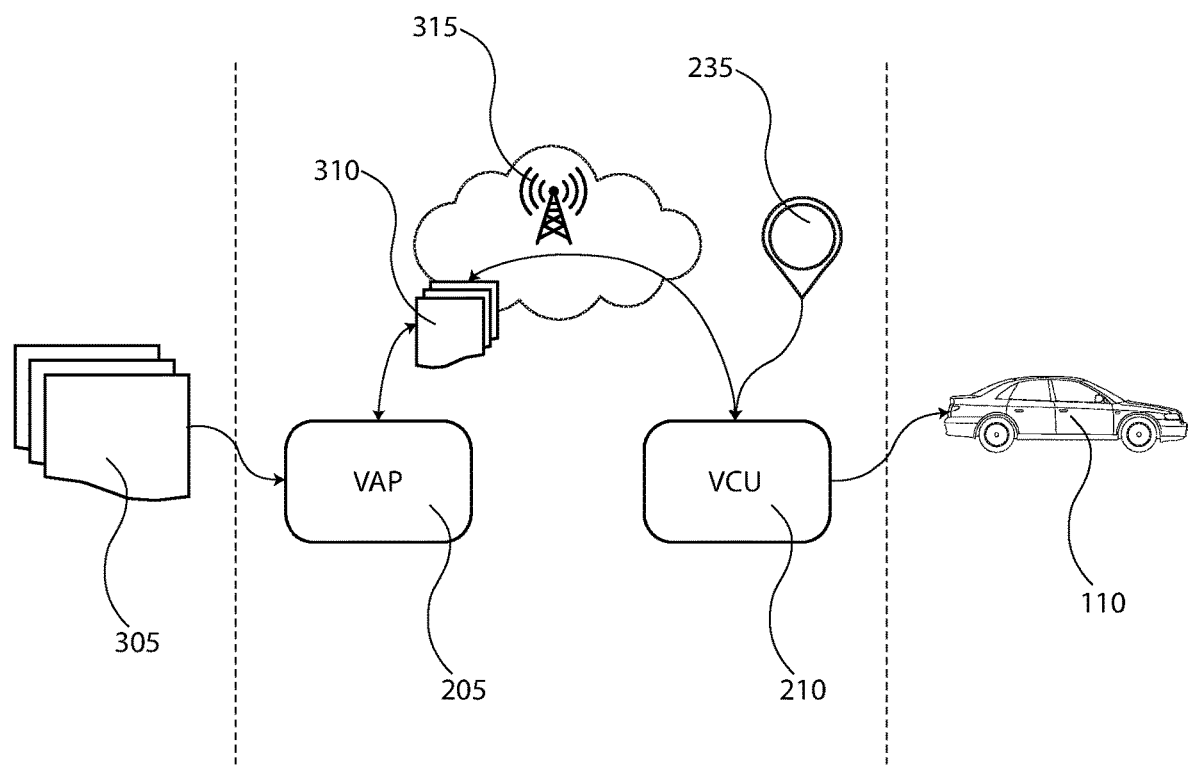
FIG. 3 illustrates how a user test plan can be created and sent to a swarming vehicle according to some embodiments.

In some embodiments, a test plan can be user generated by a user and supplied to the VAP 205 as shown in FIG. 3. For example, the test plan 305 data can be input into a spreadsheet. As another example, the test plan can be created graphically within software (e.g., at the VAP 205) that shows the position of each swarming vehicle 110 over time.

In some embodiments, the VAP 205 can translate the test plan 305 into data that can be recognized or executed by the VCU 210. The VAP 205 may communicate the translated test plan 310 to the VCU 210 over a wireless network 315 (e.g., WIFI network, Bluetooth network, radio network, Rajent network, 3G network, 4G network, 5G network, etc.). I In some embodiments, the VCU 210 may send swarming vehicle sensor data to the VAP 205 such as, for example, speed, position, heading, etc. In some embodiments, the VCU 210 may In some embodiments, the swarming vehicle 110 may include an actuation kit that can be used to drive the steering, brake, throttle, or transmission of the swarming vehicle.

Figure 4:
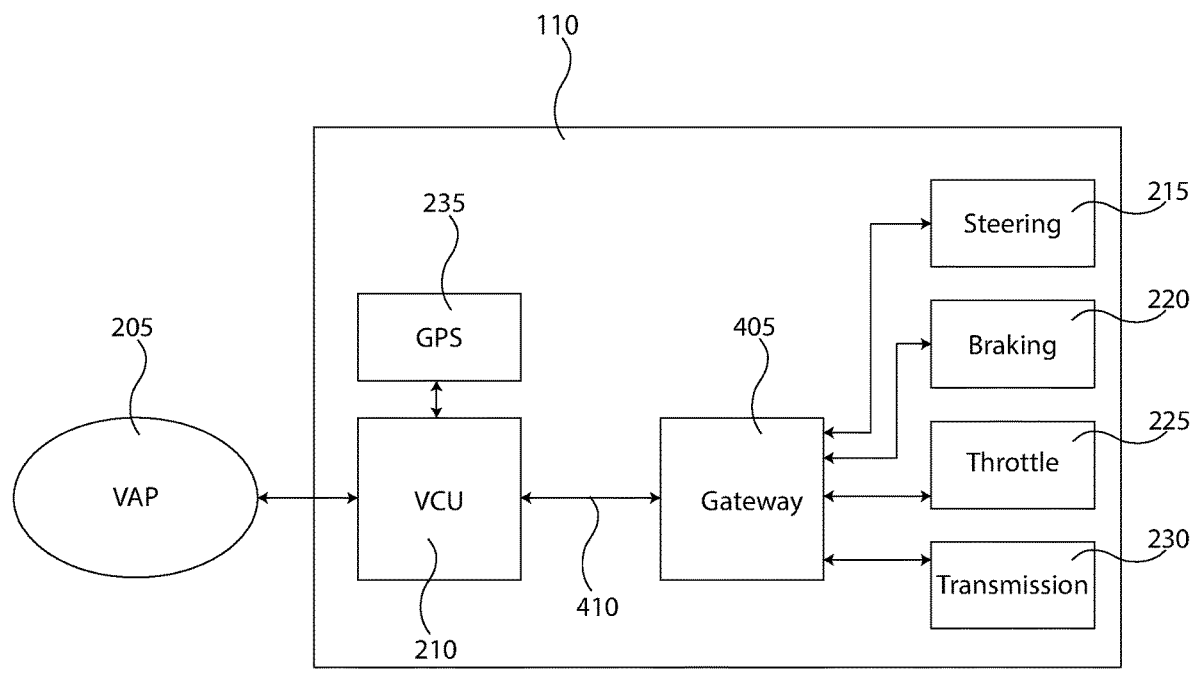
FIG. 4 shows a block diagram of a drive by wire automated swarming vehicle test system according to some embodiments.

In some embodiments, the swarming vehicle 110 may include drive by wire functionality which can control the brake, throttle, or transmission of the swarming vehicle as shown in FIG. 4. In some embodiments, the VCU 210 may communicate with a gateway 405 that can control or communicate commands to the steering 215, brake 220, throttle 225, or transmission 230. The gateway 405, for example, may be hosted by one or more servers in the cloud or include one or more local servers. The VCU 210 may communicate with the gateway 405 via a CAN bus interface 410. In some embodiments, the VCU 210 may be placed within swarming vehicle 110 and may be coupled with the gateway 405 of the swarming vehicle 110.

Figure 5:
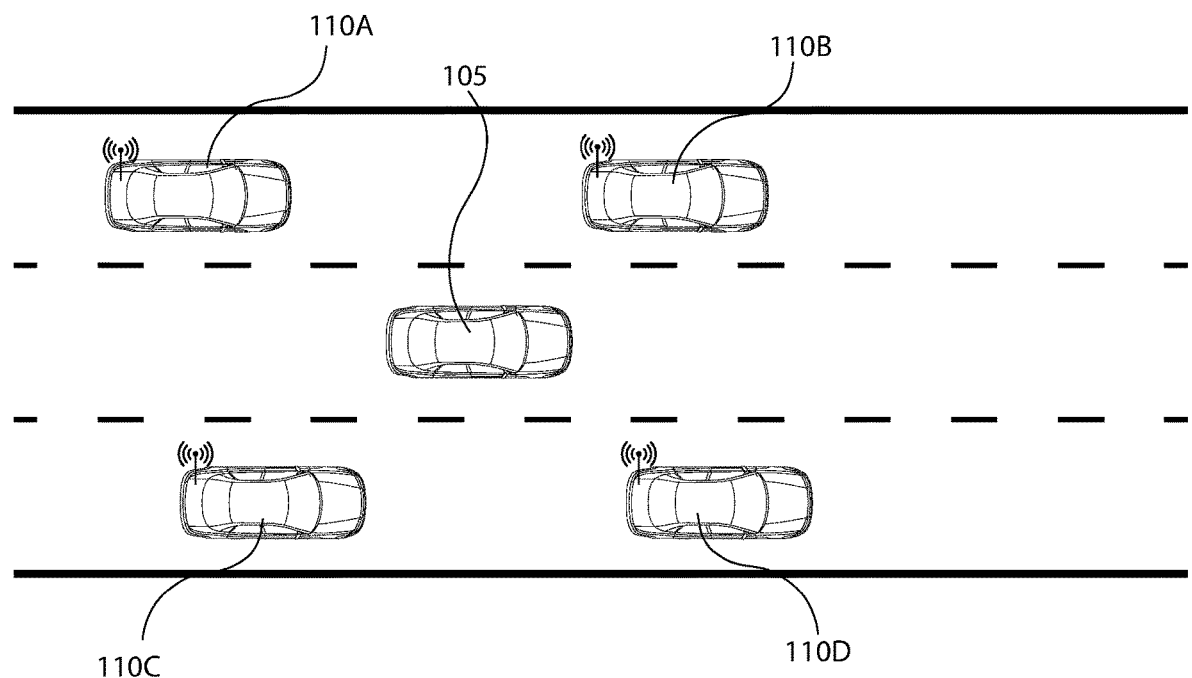
FIG. 5 is a block diagram of an automated swarming vehicle test system using vehicle to vehicle communication according to some embodiments.
Figure 5:
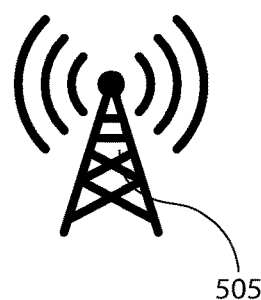

In some embodiments, the various swarming vehicles 110 may communicate trajectory data with each other. This can be done, for example, for safety and accuracy purposes. For example, each swarming vehicle may communicate with other swarming vehicles to ensure correct position is maintained or timely emergency messages are sent and received. A vehicle to vehicle communication protocol may be used as shown in FIG. 5. In some embodiments, the VCUs of the various swarming vehicles 110 may communicate with each other through a wireless network and our via a wireless network transceiver/antenna system 505. In some embodiments, the VCUs of the various swarming vehicles may communicate with each other such as, for example, trajectory data, etc. Based on trajectory data from other swarm vehicles 110, a specific swarming vehicle 110 may recognize that a collision is likely and may perform counter measures (e.g., braking, steering, speeding up, etc.) to ensure that the collision does not occur.

In some embodiments, an automated swarming vehicle test system may manage or choreograph multiple swarming vehicles in close proximity to each other at high speeds In some embodiments, an automated swarming vehicle test system may execute complex test cases with multiple vehicles with reproducible accuracy or fidelity, which may provide valuable data on the effectiveness of the test vehicle software.

In some embodiments, an automated swarming vehicle test system may convert a manned test environment to an autonomous environment, which may remove humans from risky test scenarios and may allow for more risky tests without putting the human lives at risk. Given the potential complexity of the swarming configurations, there is a higher likelihood of reduced risk to property when controlled by an automated swarming vehicle test system.

In some embodiments, an automated swarming vehicle test system may repeat a choreographed test scenario with multiple swarming vehicles the same way each time. Each test scenario, for example, may be repeated until the desired data or outcomes are achieved by the test vehicle.

In some embodiments, an automated swarming vehicle test system can reduce overall costs by eliminating recurring human costs by way of compensation, health, and varying recurring expenses.

In some embodiments, an automated swarming vehicle test system, which can the repeatedly execute test cases with a high degree of accuracy, may allow for more testing within a shorter period of time.

Figure 6:
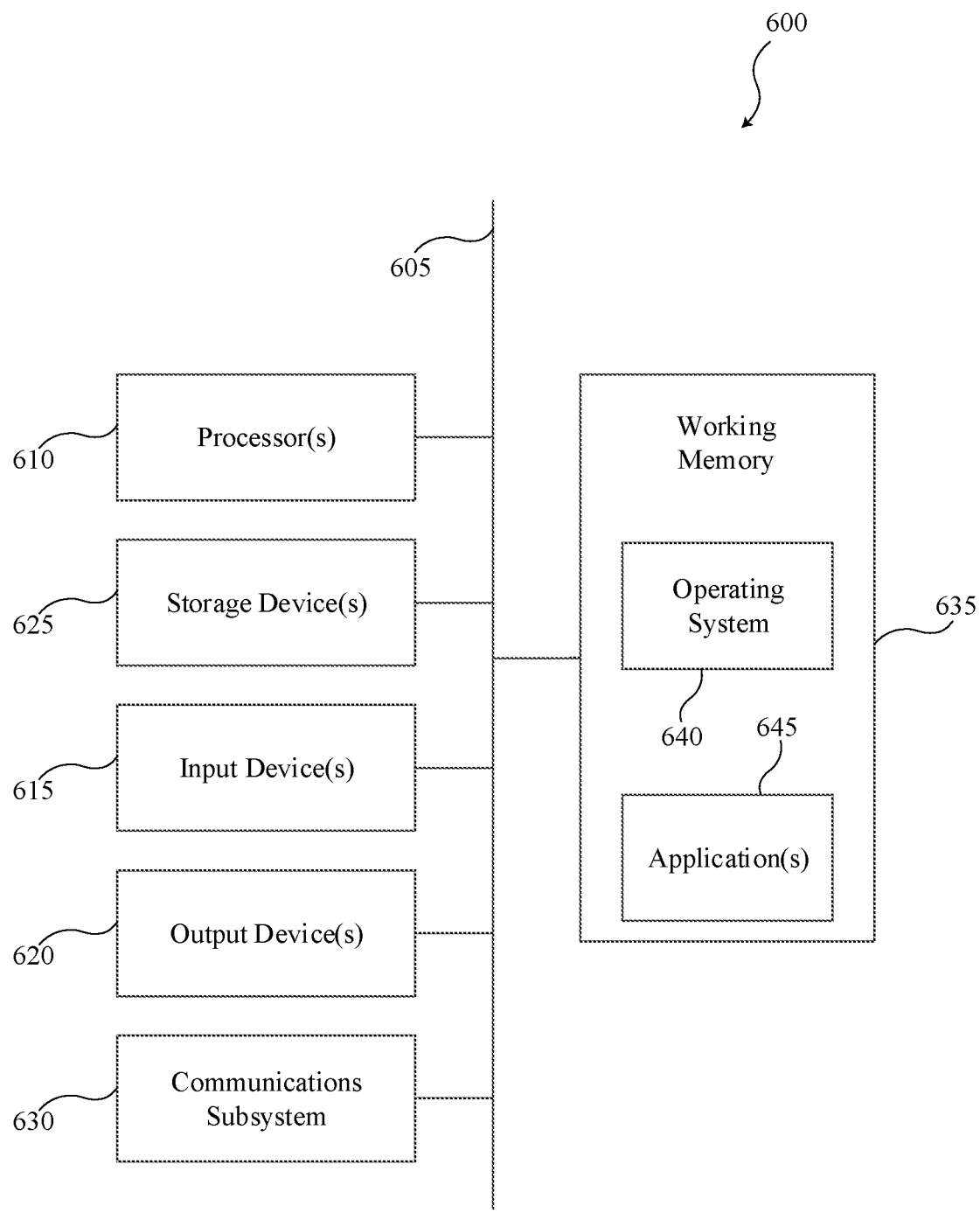
FIG. 6 shows an illustrative computational system for performing functionality to facilitate implementation of embodiments described herein.

The computational system 600, shown in FIG. 6 can be used to perform any of the embodiments of the invention. For example, a VCU 210, gateway 405, and/or VAP 205 may include any or all the components of the computational system 600. As another example, computational system 600 can be used perform any calculation, identification and/or determination described here. Computational system 600 includes hardware elements that can be electrically coupled via a bus 605 (or may otherwise be in communication, as appropriate). The hardware elements can include one or more processors 610, including without limitation one or more general-purpose processors and/or one or more special-purpose processors (such as digital signal processing chips, graphics acceleration chips, and/or the like); one or more input devices 615, which can include without limitation a mouse, a keyboard and/or the like; and one or more output devices 620, which can include without limitation a display device, a printer and/or the like.

The computational system 600 may further include (and/or be in communication with) one or more storage devices 625, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 600 might also include a communications subsystem 630, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 630 may permit data to be exchanged with a network (such as the network described below, to name one example), and/or any other devices described herein. In many embodiments, the computational system 600 will further include a working memory 635, which can include a RAM or ROM device, as described above.

The computational system 600 also can include software elements, shown as being currently located within the working memory 635, including an operating system 640 and/or other code, such as one or more application programs 645, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 625 described above.

In some cases, the storage medium might be incorporated within the computational system 600 or in communication with the computational system 600. In other embodiments, the storage medium might be separate from a computational system 600 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 600 and/or might take the form of source and/or installable code, which, upon compilation and/or installation on the computational system 600 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. An automated swarming vehicle test system comprising:
   a vehicle automation platform that:
      receives data for a system test plan from a user, wherein the test plan comprises a time series of trajectory data that includes:
      time intervals,
      test vehicle location (Vx),
      test vehicle location (Vy),
      first swarming vehicle location (TI x),
      first swarming vehicle location (TI y),
      second swarming vehicle location relative to the test v (T2 x),
      second swarming vehicle location (T2 y),
      test vehicle speed (VSpeed),
      first swarming vehicle speed (TISpeed),
      second swarming vehicle speed (T2Speed),
      test vehicle direction (Vheading),
      first swarming vehicle direction (TIHeading);
      second swarming vehicle direction;
      creates a first test plan based on the system test plan, the first test plan comprises a time series of trajectory data that define specific choreographed maneuvers for a first swarming vehicle relative to a test vehicle that vary over time,
      wherein the test vehicle is different than the first swarming vehicle and creates a second test plan based on the system test plan,
      the second test plan being different than the first test plan,
      the second test plan comprises a time series of trajectory data that define specific choreographed maneuvers for a second swarming vehicle relative to the test vehicle that vary over time;
      the first swarming vehicle comprising: a first vehicle control unit in communication with the vehicle automation platform that receives the first test plan from the vehicle automation platform;

a first throttle subsystem in communication with and controlled by the first vehicle control unit;
a first steering subsystem in communication with and controlled by the first vehicle control unit;
and a first brake subsystem in communication with and controlled by the first vehicle control unit;
wherein the first vehicle control unit controls the operation of the first throttle subsystem, the first steering subsystem, and the first brake subsystem based on the first test plan;
the second swarming vehicle comprising: a second vehicle control unit in communication with the vehicle automation platform that receives the second test plan from the vehicle automation platform;
a second throttle subsystem in communication with and controlled by the second vehicle control unit;
a second steering subsystem in communication with and controlled by the second vehicle control unit;
and a second brake subsystem in communication with and controlled by the second vehicle control unit;
wherein the second vehicle control unit controls the operation of the second throttle subsystem, the second steering subsystem, and the second brake subsystem based on the second test plan,
wherein the vehicle automation platform does not send the first test plan or the second test plan to the test vehicle.

2. The automated swarming vehicle test system according to claim 1, further comprising:
a third swarming vehicle comprising:
a third vehicle control unit in communication with the vehicle automation platform and that receives a third test plan from the vehicle automation platform, wherein the third test plan is based on the system test plan, the third test plan comprises a time series of trajectory data that define specific choreographed maneuvers for the third swarming vehicle relative to the test vehicle that varies over time;
a third throttle subsystem in communication with and controlled by the third vehicle control unit;
a third steering subsystem in communication with and controlled by the third vehicle control unit; and
a third brake subsystem in communication with and controlled by the third vehicle control unit;
wherein the third vehicle control unit controls the operation of the second throttle subsystem, the third steering subsystem, and the second brake subsystem based on the third test plan.

3. The automated swarming vehicle test system according to claim 1, wherein the vehicle automation platform comprises a server that is in wireless communication with the first vehicle control unit and the second vehicle control unit.

4. The automated swarming vehicle test system according to claim 1, wherein the first swarming vehicle comprises a first GPS sensor; and the first vehicle control unit monitors the position of the first swarming vehicle relative to the test vehicle using the first GPS sensor; and wherein the second swarming vehicle comprises a second GPS sensor; and the second vehicle control unit monitors the position of the second swarming vehicle relative to the test vehicle using the second GPS sensor.

5. The automated swarming vehicle test system according to claim 1,
wherein the first swarming vehicle includes a first GPS,
wherein the first vehicle control unit monitors the position and the trajectory of the first swarming vehicle relative to the test vehicle, and
wherein the first vehicle control unit stops the first swarming vehicle in the event the trajectory of the first swarming vehicle will cause an accident with the test vehicle.

6. The automated swarming vehicle test system according to claim 1, wherein the first vehicle control unit produces control signals for first throttle subsystem, the first brake subsystem, or the first steering subsystem based on the first test plan.

7. A vehicle automation platform comprising:
a transceiver; and
a controller communicatively coupled with the transceiver, the controller:
creates a first test plan for a first swarming vehicle, the first test plan comprises a time series of trajectory data that define specific choreographed maneuvers that vary over time, the first test plan comprises:
a time series of vehicle trajectory data for the first swarming vehicle that includes:
time intervals,
test vehicle location (Vx),
test vehicle location (Vy),
first swarming vehicle location (T1 x),
first swarming vehicle location (T1 y),
test vehicle speed (VSpeed),
first swarming vehicle speed (T1Speed),
test vehicle direction (Vheading), and
first swarming vehicle direction (T1Heading);
sends the first test plan to the first swarming vehicle via the transceiver;
creates a second test plan for a second swarming vehicle, the second test plan comprises a time series of trajectory data that define specific choreographed maneuvers that vary over time, the second test plan is different than the first test plan, the second test plan comprises:
a time series of vehicle trajectory data for the second swarming vehicle that includes:
time intervals,
test vehicle location (Vx),
test vehicle location (Vy),
second swarming vehicle location (T1 x),
second swarming vehicle location (T1 y),
test vehicle speed (VSpeed),
second swarming vehicle speed (T1Speed), and
test vehicle direction (Vheading),
second swarming vehicle direction (T1Heading); and
sends the second test plan to the second swarming vehicle via the transceiver;
wherein the controller does not send the first test plan or the second test plan to the test vehicle.

8. The vehicle automation platform according to claim 7, wherein the controller receives a system test plan from a user and creates the first test plan and the second test plan based on the system test plan.

9. The vehicle automation platform according to claim 7, wherein the first test plan and the second test plan are included in a single test plan that includes the first test plan and the second test plan.

10. The vehicle automation platform according to claim 7, wherein the controller creates a third test plan for a third swarming vehicle, the third test plan comprises:
a time series of vehicle trajectory data for the third swarming vehicle, and
position data for the third swarming vehicle relative to the test vehicle; and
wherein the controller sends the third test plan to the third swarming vehicle via the transceiver.

11. A method comprising:
creating at a vehicle automation platform a first test plan for a first swarming vehicle, the first test plan comprises a time series of trajectory data that define specific choregraphed maneuvers that vary over time, the first test plan comprises:
  time intervals,
  test vehicle location (Vx),
  test vehicle location (Vy),
  first swarming vehicle location (T1 x),
  first swarming vehicle location (T1 y),
  test vehicle speed (VSpeed),
  first swarming vehicle speed (T1Speed),
  test vehicle direction (Vheading), and
  first swarming vehicle direction (T1Heading);
sending the first test plan from the vehicle automation platform to the first swarming vehicle;
creating at the vehicle automation platform a second test plan for a second swarming vehicle, the second test plan comprises a time series of trajectory data that define specific choregraphed maneuvers that vary over time, the second test plan is different than the first test plan the second test plan comprises:
  time intervals,
  test vehicle location (Vx),
  test vehicle location (Vy),
  second swarming vehicle location (T1 x),
  second swarming vehicle location (T1 y),
  test vehicle speed (VSpeed),
  second swarming vehicle speed (T1Speed),
  test vehicle direction (Vheading), and
  second swarming vehicle direction (T1Heading)
  and
sending the second test plan from the vehicle automation platform to the second swarming vehicle;
wherein the vehicle automation platform does not send the first test plan or the second test plan to the test vehicle.

12. The method according to claim 11, further comprising receiving a system test plan from a user; and wherein the first test plan is created based on the system test plan, and wherein the second test plan is created based on the system test plan.

13. The method according to claim 11, wherein the first test plan and the second test plan are included in a single test plan that includes the first test plan and the second test plan.

14. The method according to claim 11, further comprising:
  creating at the vehicle automation platform a third test plan for a third swarming vehicle, the third test plan comprises:
  a time series of vehicle trajectory data for the third swarming vehicle, and
  position data for the third swarming vehicle relative to the test vehicle; and
  sending the third test plan from the vehicle automation platform to the third swarming vehicle.

* * * * *